United States Patent
Bedworth

(10) Patent No.: US 8,938,797 B2
(45) Date of Patent: *Jan. 20, 2015

(54) USER VALIDATION USING IMAGES

(75) Inventor: Mark Dwight Bedworth, Wolverhampton (GB)

(73) Assignee: Pinoptic Limited, Newcastle Upon Tyne (GB)

(*) Notice: Subject to any disclaimer, the term of this patent is extended or adjusted under 35 U.S.C. 154(b) by 247 days.

This patent is subject to a terminal disclaimer.

(21) Appl. No.: 13/556,743

(22) Filed: Jul. 24, 2012

(65) Prior Publication Data

US 2013/0021249 A1    Jan. 24, 2013

Related U.S. Application Data

(63) Continuation of application No. PCT/GB2005/004846, filed on Dec. 16, 2005.

(60) Provisional application No. 60/636,311, filed on Dec. 16, 2004.

(51) Int. Cl.
| | |
|---|---|
| *G05B 19/00* | (2006.01) |
| *G06F 3/02* | (2006.01) |
| *G06F 21/36* | (2013.01) |

(52) U.S. Cl.
CPC ................................. *G06F 21/36* (2013.01)
USPC ............................................ 726/18; 340/5.8

(58) Field of Classification Search
CPC ....... G06F 21/31; G06F 21/36; G06F 3/0622; G06Q 20/3674; G06Q 20/401; H04W 12/06
USPC ..................................... 340/5, 8, 5.8; 726/18
See application file for complete search history.

(56) References Cited

U.S. PATENT DOCUMENTS

| | | | |
|---|---|---|---|
| 5,428,349 A | 6/1995 | Baker | |
| 5,559,961 A | 9/1996 | Blonder | |
| 5,608,387 A | 3/1997 | Davies | |
| 5,664,099 A | 9/1997 | Ozzie et al. | |
| 5,821,933 A * | 10/1998 | Keller et al. | 715/741 |
| 6,209,104 B1 | 3/2001 | Jalili | |
| 6,950,949 B1 | 9/2005 | Gilchrist | |
| 6,980,081 B2 * | 12/2005 | Anderson | 340/5.53 |

(Continued)

FOREIGN PATENT DOCUMENTS

| | | |
|---|---|---|
| FR | 2819323 | 7/2002 |
| KR | 20020026636 | 4/2002 |

*Primary Examiner* — Michael Chao
*Assistant Examiner* — Shiuh-Huei Ku
(74) *Attorney, Agent, or Firm* — EIP US LLP

(57) ABSTRACT

A method of validating a user, comprises the steps of:— storing for a user data representative of a validation code for the user comprising a combination of symbols selected from a set of symbols; presenting a displayed image including a plurality of designatable areas in which said set of symbols is distributed between said designatable areas such that each designatable area contains a plurality of said symbols; varying the image between subsequent presentations such that the distribution of said symbols between said designatable areas changes between subsequent presentations, validating a user in an validation routine by detecting designation by a user of a combination of said designatable areas in a presented image, and determining whether the combination of designated designatable areas contains the combination of symbols making up the validation code for said user.

15 Claims, 7 Drawing Sheets

(56) References Cited

U.S. PATENT DOCUMENTS

| | | |
|---|---|---|
| 7,188,314 B2 | 3/2007 | Mizrah |
| 7,219,368 B2 | 5/2007 | Juels et al. |
| 7,240,367 B2 | 7/2007 | Park |
| 7,266,693 B1 | 9/2007 | Potter et al. |
| 7,539,874 B2 | 5/2009 | Waterland |
| 7,577,987 B2 | 8/2009 | Mizrah |
| 7,725,388 B2 | 5/2010 | Wilkinson |
| 7,734,929 B2 | 6/2010 | Debrito |
| 7,770,209 B2 | 8/2010 | Billingsley et al. |
| 2002/0188872 A1 | 12/2002 | Willeby |
| 2003/0191947 A1 | 10/2003 | Stubblefield et al. |
| 2004/0010721 A1 | 1/2004 | Kirovski et al. |
| 2004/0030933 A1 | 2/2004 | Park |
| 2004/0030934 A1 | 2/2004 | Mizoguchi et al. |
| 2004/0230843 A1 | 11/2004 | Jansen |
| 2004/0260955 A1 | 12/2004 | Mantyla |

\* cited by examiner

| Digit | 1 | 2 | 3 | 4 | 5 | 6 | 7 | 8 | 9 | 0 |
|---|---|---|---|---|---|---|---|---|---|---|
| Nature | Man | Rhino | Crab | Horse | Bird | Fish | Camel | Lizard | Bat | Elephant |
| Household | Guitar | Phone | House | Candle | Bottle | Boot | Glass | Key | Umbrella | Teapot |

| Digit | 1 | 2 | 3 | 4 | 5 | 6 | 7 | 8 | 9 | 0 |
|---|---|---|---|---|---|---|---|---|---|---|
| Nature | Elephant | Lizard | Man | Crab | Camel | Bat | Horse | Rhino | Fish | Bird |
| Household | Umbrella | Candle | Guitar | Teapot | House | Boot | Glass | Key | Phone | Bottle |

Keyed digits

*[1 2 7 2]*

PINoptic Securing the future of personal identification

Verify new PIC for JoeBloggs

*Fig. 5(a)*

| Digit | 1 | 2 | 3 | 4 | 5 | 6 | 7 | 8 | 9 | 0 |
|---|---|---|---|---|---|---|---|---|---|---|
| Nature | Horse | Rhino | Fish | Bird | Elephant | Lizard | Man | Crab | Camel | Bat |
| Household | Teapot | House | Boot | Glass | Key | Phone | Bottle | Umbrella | Candle | Guitar |

*Fig. 5(b)*

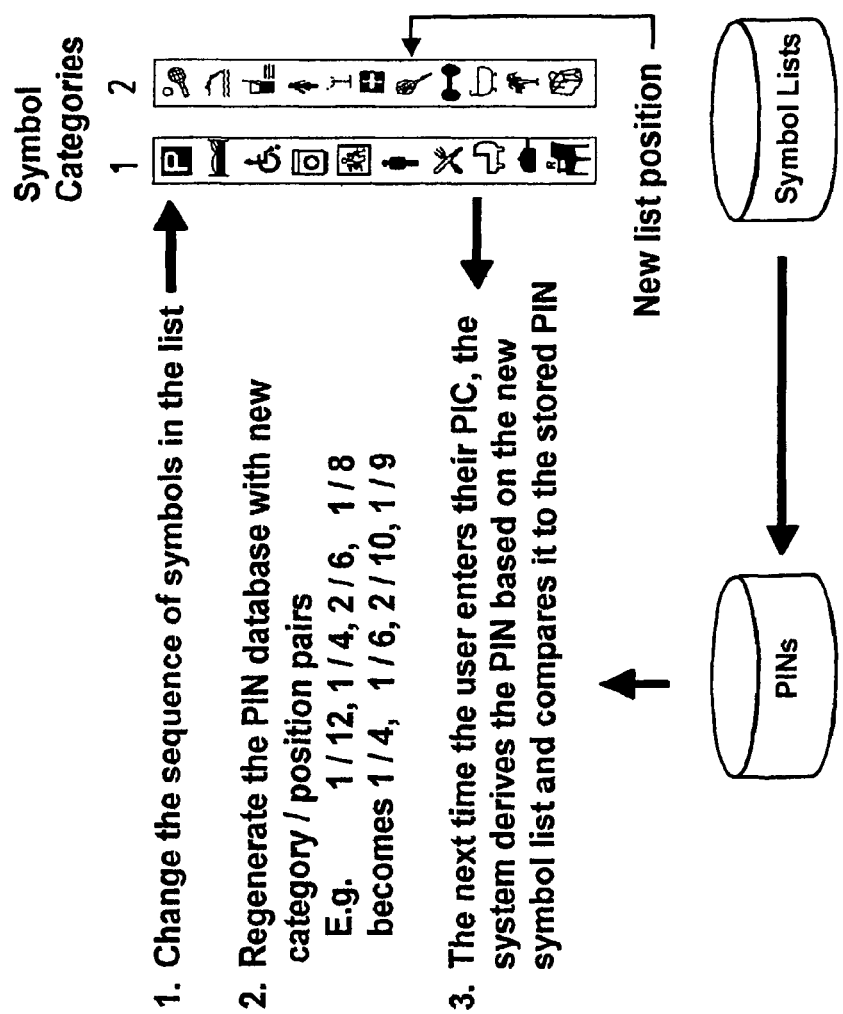

US 8,938,797 B2

USER VALIDATION USING IMAGES

CROSS REFERENCE TO RELATED APPLICATIONS

This Patent application is a Continuation of PCT Application No. PCT/GB2005/004846, filed Dec. 16, 2005, entitled "USER VALIDATION USING IMAGES" (U.S. application Ser. No. 11/721,998), which claims the benefit of U.S. Provisional Application No. 60/636,311, filed on Dec. 16, 2004, entitled, "USER VALIDATION USING IMAGES", and which further claims priority to United Kingdom Application No. 0427508.7, filed Dec. 16, 2004, entitled "USER VALIDATION USING IMAGES", the contents and teachings of which are hereby incorporated by reference in their entirety.

This invention relates to apparatus, methods, systems and computer software for validating a user.

There is a huge range of applications where a user needs to be validated before being allowed access to a resource. Typical examples include the ubiquitous Personal Identification Number (PIN) which is used for applications as varied as building access, automatic teller machines (ATMs), vehicle alarms, mobile phones, portable digital assistants (PDAs), to name but a few. As is well-known, the user must key in a PIN code before being allowed access to the resource. In some systems, such as relatively low level security access to buildings, a common PIN code is circulated to all members of the group authorised to have access. In other situations, each user is allocated a specific user ID and a related PIN code. The problem with both types of system is that it is relatively easy for a casual observer, or 'shoulder surfer', to observe and memorise the PIN code being punched in and then later gain unauthorised access to the resource. In ATM fraud it is also known for the fraudster to attach a miniature camera to monitor the key pad as the PIN code is entered whilst also providing a device to read the user 10 off the ATM card as it is inserted into the ATM. ATM fraud is a major problem in the UK and worldwide. Recent figures in the UK suggest losses of the order of £65 million with this having increased by 85% over the past year. In the USA the cost of ATM fraud is put at nearly US$200 million a year, and rapidly increasing.

The fraudulent use of debit and credit cards at point of sale is also a major problem with a major move afoot to switch over to a PIN and chip system whereby the debit or credit card is provided with a chip providing a far higher level of security at the point of sale to validate the transaction than is possible with the conventional magnetic stripe, and also requires the user to enter a PIN code. However there is still a significant risk of the fraudster observing and memorising the PIN code and later stealing the card to obtain access to the account.

Another problem with PIN codes is that users tend to find it quite hard to memorise even short strings of numbers and so it is not uncommon for users to keep a surreptitious record of the PIN code in their purse or wallet which is only too easy for the fraudster to discover. This problem can also be exacerbated where the user has to remember several different PIN codes, or where they seek to remedy this problem by having a common PIN code for several cards which simply magnifies the potential risk.

Thus there is a need for a system of user validation for which the security of the system does not rely solely on the keying in of numerical data. The terms 'authentication' and validation are used synonymously in this specification.

Accordingly, in one aspect, this invention provides a method of validating a user, which comprises the steps of:

storing for a user data representative of a validation code for the user comprising a combination of symbols selected from a set of symbols;

presenting a displayed image including a plurality of designatable areas in which said set of symbols is distributed between said designatable areas such that each designatable area contains a plurality of said symbols;

varying the image between subsequent presentations such that the distribution of said symbols between said designatable areas changes between subsequent presentations, validating a user in a validation routine by detecting the designation by a user of a combination of said designatable areas in a presented image, and determining whether the combination of designated designatable areas contains the combination of symbols making up the validation code for said user.

In another aspect this invention provides a user code system including:

means for presenting an image including a plurality of designatable areas in which said set of symbols is distributed between said designatable areas such that each designatable area contains a plurality of said symbols;

area designation means operable by a user to identify a combination of said designatable areas containing a combination of symbols making up a code chosen by the user, means for subsequently presenting at least one altered image in which the distribution of said symbols between said designatable areas is changed, symbol identification means responsive to the user identifying in the (or each) altered image the combination of said designatable areas containing the combination of symbols making up said chosen code to thereby unambiguously determine the symbols making up said chosen code.

In another aspect, this invention provides apparatus for validating a user, said apparatus including:

a display for receiving an image data signal and displaying an image to the user;

an image generator for generating a succession of image data signals representing test images each containing a plurality of visual elements each possessing one or more characteristics, and in which the spatial distribution of at least some of said characteristics alters between subsequent test images;

user input means for use by the user to designate from said displayed image a selection of one or more of said visual elements, and validation means for processing the output from said user input means to compare the characteristics of the (or each) visual element making up the designated selection with a predetermined code set of characteristics, and providing a validation signal if there is a match between the characteristics of said selection and the characteristics of said code set.

The term 'visual element' is used to mean a discernible item or group of items in an image. It may be a single item having several different characteristics, or it could be a group of items. The visual element is otherwise referred to herein more specifically as a button. Each visual element selected will have several characteristics, and so the validation means will check whether the characteristics of a selected visual elements includes of the characteristics of the code set. Thus each visual element might possess say four characteristics, and the predetermined code set might comprise four characteristics, and the validation means will check each designated visual element to see if it contains the appropriate characteristic corresponding to the code set.

In the described arrangements, the user analyses the image presented on the display and designates a selection of the visual elements making up the image which have characteristics which correspond to their predetermined code set. As a simple illustrative example, the predetermined code set of characteristics may be 'red' 'shiny' and 'striped'. The user would therefore need to look for three visual elements in the image each having one of these characteristics. This scheme has the advantage that it does not necessarily require numbers to be memorised and also visual elements in the image will preferably have several different characteristics associated with them and so someone watching as the visual elements are designated will not know which characteristic of the selected object is a member of the code set. The term 'characteristic' is however intended to be used broadly to cover not only the visual features exemplified above, but also actual visual items combined in a visual element such as e.g. numerals, symbols or pictograms.

Although I do not exclude other ways of designating the selection of visual elements in the image, it is preferred for the user input means being operable to allow the user to effect said designation by reference to the location or locations of the visual elements within the image. The location may be designated in a wide range of different ways. For example, the user input means may comprise a touch screen overlaid on the display so the user simply taps the relevant visual element on the screen to effect designation thereof. Alternatively, the image generator may be responsive to the user input means to display a moveable visual symbol or cursor at a location determined by the input applied to the user input means. In this instance the user input means may be a pointing device such as a touch pad, a mouse, a joystick, a key pad with cursor control keys, or a gaze location system.

In another arrangement, the (or each} visual element may be selected by identifying, e.g. by use of coordinates, a notional cell containing the visual object. For this, the image itself may include an overlaid grid with coordinate labels, and the relevant coordinate labels may be input via the input means. Here the input means could comprise a conventional 10 or 12 button numerical key pad or the like. The verification means may prompt the user to input, say, the 'X' coordinate followed by the 'Y' coordinate. Alternatively, there may be an array of buttons along the base and side of the display which can be pressed to identify the cell containing the selected visual element. Still further, e.g. on a mobile phone, the user may designate a selected 'button' as a keypad displayed on the screen by keying the corresponding key on the actual keypad.

In another arrangement, the (or each) notional cell containing the visual object is identified by having the user speak the name of the label associated with that cell (rather than their code characteristic which is associated with that cell); a voice recognition system would be used here to identify which cell or cells the user indicated. The invention also extends to an arrangement adapted for but not exclusively for those with impaired sight in which the contents of each of the cells are communicated verbally rather than visually, e.g. by a text to speech converter.

Although it would be possible to provide a validation system in which the same image was displayed for subsequent validation routines, for greater security, it is much preferred for the image generator to present a different or rearranged image for subsequent validation routines. Thus the image generator may have a gallery of different images which it uses in order or at random, repeating as necessary. This provides a significant advantage because, even if a fraudster has memorised the key strokes, screen taps, etc. during a previous validation routine, the location and order of the key strokes or screen taps will almost certainly be different for a different image, even though the underlying code set remains unchanged.

In some instances, where the image changes for subsequent validations, the user may not immediately spot the relevant visual elements in the scene presented to them. In this case, the validation means may be operable to cause the image generator to generate an alternative image in response to a request supplied via said user input means. The number of alternative images in a given session may be limited.

Although in many instances the visual elements may be spaced apart from each other, in some instances, two or more visual elements may be contiguous, overlap or be superimposed, defining a combined visual element which is deemed to possess the characteristics of each of the constituent visual elements.

The image itself may take many forms; at a relatively simple level, the image may include a background with a plurality of different geometric shapes or symbols (which may include numeric symbols for the purpose of compatibility with existing systems). The geometric shapes may have different colours, patterns or other characteristics. Alternatively, the image may include a plurality of regions of different colours; in its simplest form, the image could comprise a rectangular array of regions or virtual buttons offering different characteristics;

for example, each virtual button may have associated with it a selection of one or more colours, a patterns, and/or symbols.

In a different arrangement, the image may be composed of a foreground and a background with the various visual elements being associated with or part of either or both. Here, the image may comprise a pseudo-realistic scene such as a cartoon still. The pseudo-realistic scene may be composed by selecting a background and distributing a plurality of selected templates across the background. Thus, for example, the template may comprise the outline of a person with different regions for a T-shirt, trousers and shoes. The template may then be selectively rendered so that, in the rendered image, the T-shirt, trousers and shoes of different colours and/or patterns. In this way, various visual objects such as the person created in the image using the template will have a number of different characteristics. The image could be moving or still.

Alternatively, the image may comprise a photographic scene which has been carefully selected so as to have a number of visual objects, with at least some of the visual objects having two or more distinguishable characteristics associated with them.

Preferably the validation means includes means for storing a mapping of the distribution of the various characteristics across the image, with said validation means being operable on receipt of a user input designating a location in the viewed image to identify or retrieve the characteristics associated with that location. In one arrangement the validation means may be operable to allow a succession of locations to be designated in a designation session, wherein for each such location, the validation means compares the respective identified characteristics with those of the code set. Depending on the level of security required, the code set of characteristics may have associated therewith a predetermined sequence, with a validation signal being provided only if the relevant characteristics of the visual elements designated by the user are in a corresponding sequence.

Depending on the particular application, the apparatus may be used without further identification of the user, for example where a group of users are provided with the same common code set of characteristics. Alternatively, an arrangement may be set up for multiple users, each of which having a user ID, in which said validation means may store respective code sets for each user 10. In use each user will input their user 10 via said user input means and the validation means in this embodiment will obtain the code set associated with said user ID and perform validation on the basis of said retrieved code set. Depending on whether the code set has a predetermined sequence associated with it, and also upon the number of users, there may be some duplication of code sets.

There are a variety of ways of programming the code set of characteristics into the apparatus. This may be done without user intervention by supplying the user with a preordained code set. However, for many applications it is preferable to allow the user to program their own code set according to what is memorable for them. In one arrangement, this may be done by causing the image generator to present for display one or more code setting images each containing a pluralityy of visual elements each possessing one or more characteristics. In this arrangement the user, having identified a visual element in the code setting image possessing a selected characteristic will supply location information of that visual element via the user input means. The user may repeat this operation with further, different code setting images to unambiguously identify the selected characteristics. This may be done for each member of the code set in turn one after the other or by identifying all the members of the code set in the first image and repeating this for subsequent images until all members of the code set have been unambiguously identified. Alternatively, the user may identify the particular characteristics by supplying information via the user input means either directly or in response to navigating a menu. A hybrid arrangement is also possible.

In some arrangements, the display, user input means, image generator means and validation means may be co-located, for example if the apparatus is used to restrict access to a mobile telephone or is a stand-alone, non-networked building access system. In many other instances the display and user input means may be provided at a client station or user interface, with at least the validation means and possibly the image generation means provided at a remote location. This option would be applicable for example to ATM machines or for safeguarding web transactions such as online banking, online shopping etc, as well as EPOS.

Accordingly the invention extends to a server for use with a remote interface, the remote interface including a display, and user interface means, said server being operable to transmit to said remote interface image data representing a test image comprising a plurality of visual elements each possessing one or more characteristics, and being further operable to receive from remote interface user data identifying one or more regions in, or visual elements of, said test image, said server including validation means for determining the characteristics of the or each selected region or visual element, comparing the determined characteristics with a code set of characteristics, and outputting a validation signal if there is a correspondence.

In another aspect, this invention provides a method of validating a user, wherein a test image is displayed to the user, the test image containing a plurality of visual elements each possessing one or more characteristics, the user having been assigned or having selected a code set comprising a selection from all the characteristics present in the test image, and wherein, in a validation step, the user selects from said test image a selection of visual elements, and validation is affirmed if the selection of visual elements possess the selected characteristics of the code set.

The invention also extends to a computer program product comprising a computer readable medium having thereon computer program code means which, when the program code is loaded, causes a computer to execute a procedure to:

generate a test image for display to a user, said test image containing a plurality of visual elements each possessing one or more characteristics;

receive user data identifying a selection of said visual elements in said image;

determine the characteristics associated with each of the visual elements identified in said image;

compare the characteristics thereby determined with a code set of characteristics, and output a validation signal if the selected visual elements possess the selected characteristics of the code set.

The apparatus, method, and related systems may form part of a system for allowing an individual, or a group of individuals, physical access to an area, for example via a door or gate entry system.

Likewise, the apparatus, method and associated systems may be used to form part of a system for allowing an individual, or group of individuals, access to certain information, such as for example, access to the internet, access to a portable digital appliance, access to a computer or access to a computer network.

The apparatus, method and associated systems may be used to form part of a system for allowing an individual, or group of individuals, access to resources, for example vending machines, access to, and operation of, vehicles.

The apparatus, method and associated systems may form part of a system for allowing an individual, or group of individuals, access to financial resources, for example ATMs or web-based transactions.

The apparatus, methods and associated systems may form part of a system for authorising credit or debit card transactions on an electronic point of sale, using the customer's mobile phone. In such a system, a remote validation centre would transmit an image in suitable manner e.g. by MMS message or local wireless means and the user would designate the visual elements using the keypad of the phone or a pointing device. For example, the image might be in the form of a 1 0 or 12 button keypad grid with the user designating a cell in the grid by pressing the corresponding key.

The invention extends to systems as described above which incorporate the apparatus or method as set out.

Whilst the invention has been described above, it extends to any inventive combination of features set out above or in the following description. In particular any of the features described in the latter aspects may be used in conjunction with the first aspect.

The invention may be performed in various ways, and various embodiments thereof will now be described by way of example only, reference being made to the accompanying drawings in which.

Figures 3A, 3B:
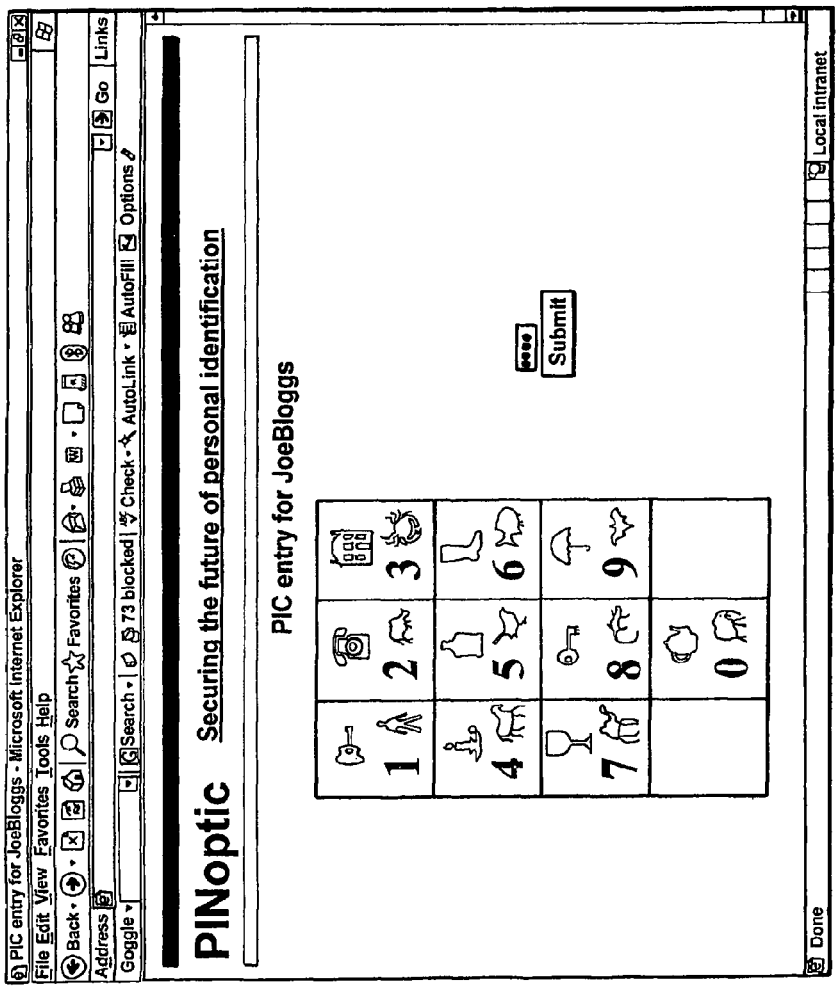
Figures 4A, 4B:
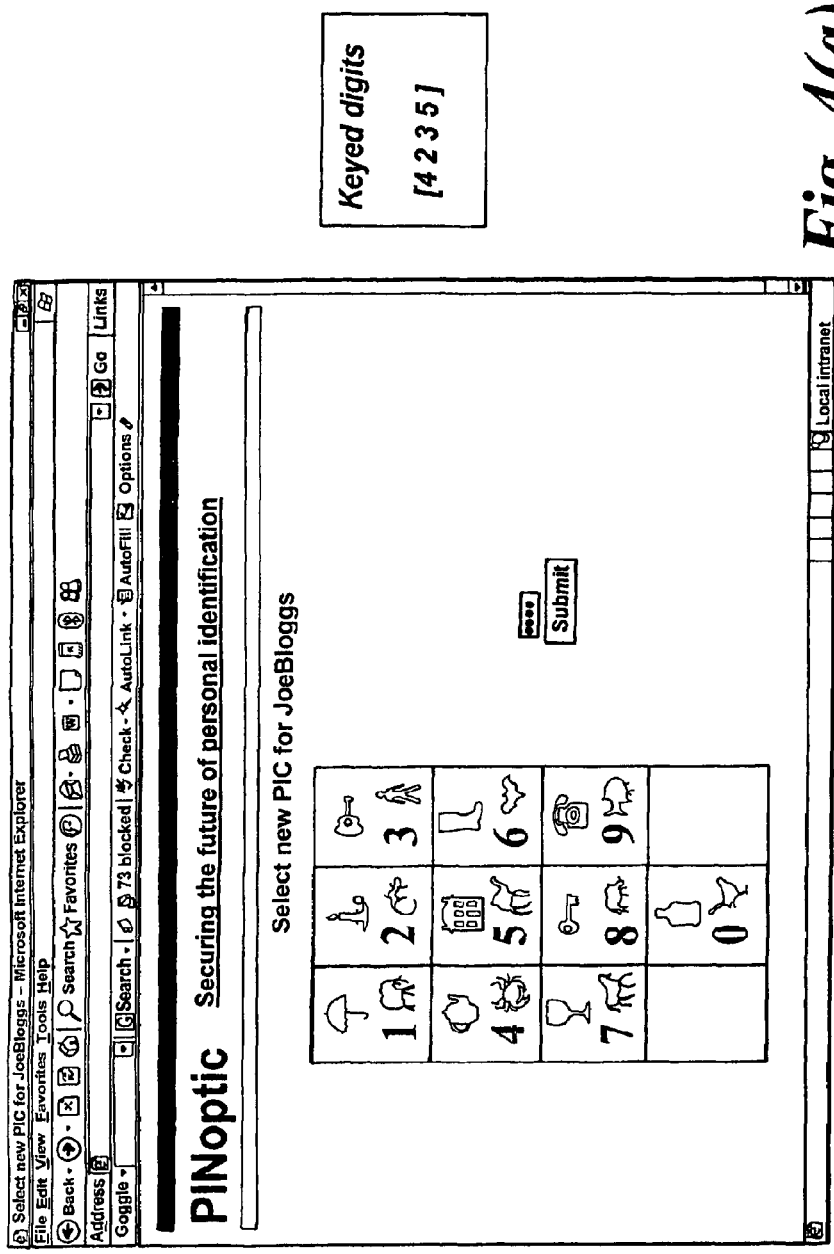
Figure 6:
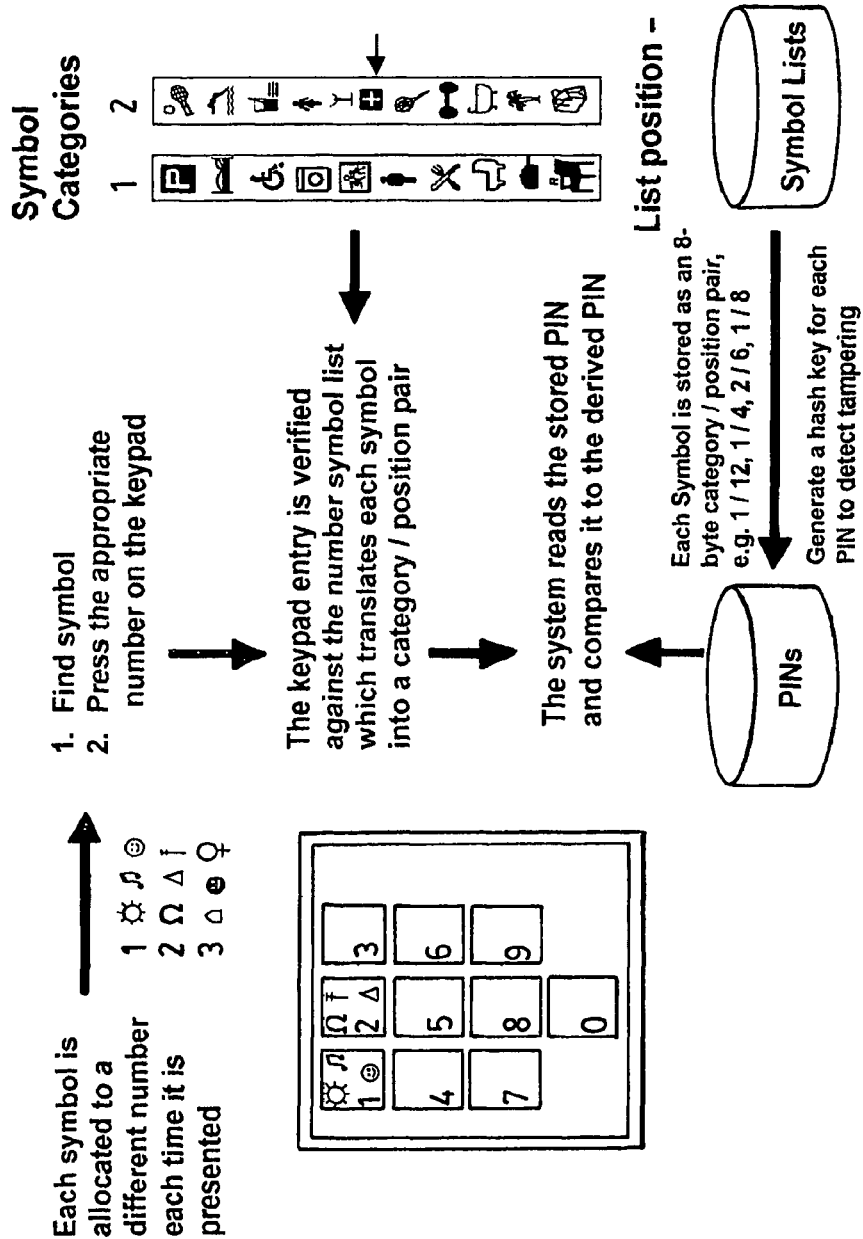

FIGS. 3(a) and 3(b) are a typical example of screen shots presented in various embodiments of the invention and a table mapping the pictogram distributions in that screen shot, respectively;

FIGS. 4(a) and 4{b} are another typical example of screen shots presented in various embodiments of the invention and a table mapping the pictogram distributions in that screen shot, respectively;

FIGS. 5(a) and 5{b) are a further typical example of screen shots presented in various embodiments of the invention and a table mapping the pictogram distributions in that screen shot, respectively;

FIG. 6 is a diagrammatic representation of the steps involved in an example of user verification, and FIG. 7 is a diagram for showing how the server may generate a fresh PIC database.

Figure 1:
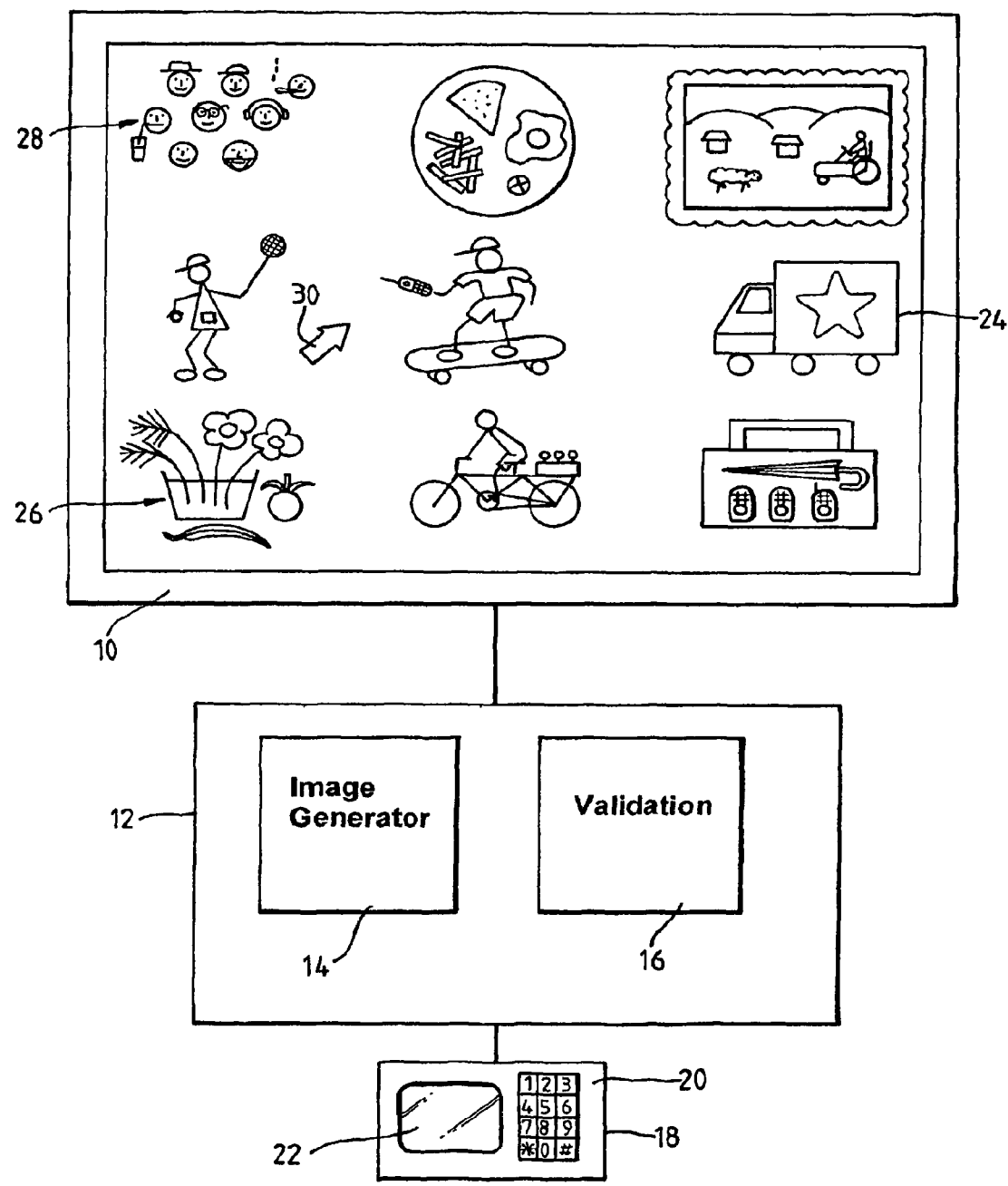
FIG. 1 is a schematic view of an embodiment of user validation system in accordance with this invention.

Referring to FIG. 1, the apparatus comprises a display 10, a processing unit 12 which supplies image data to the display 10 and which incorporates an image generator 14 and a validation unit 16. A user interface 18 is connected to the processor 12 and includes a key pad 20 and a touch pad 22.

In this embodiment, the image generator generates an image which is displayed on the display 10 and comprises a number of visual elements 24 distributed over the extent of the image. For the purposes of illustration, in this embodiment, the visual elements are disposed in a 3×3 array so that each visual element lies within a particular cell of the grid. As to be discussed later, however, the invention is not limited to the grid structure. In this example, the visual element could be a single item such as the van 24 or it could be a colocation of items such as the still life 26 or the group portrait 28. Each of the visual elements possesses a set of characteristics which, replicating the 3×3 array include the following:

| Hat | Plate | Picture |
| Bottle | Pizza | Frame |
| Straw | Chips | Hill |
| Beard | Egg | Tractor |
| Glasses | Tomato | Sheep |
| Headphones | | Man |
| Cigarette | | House |
| Hat | Skateboard | Van |
| Dress | Shorts | Wheels |
| Square logo | T-shirt | Star logo |
| Ball | | |
| Racket | | |
| Vase | Bicycle | Briefcase |
| Flowers | Man | Umbrella |
| Apple | T-shirt | Shoes |
| Banana | Apples | Mobile phone |
| | Trousers | |

In addition to the characteristics listed in the above, there may also be further characteristics concerning, for example, colour or pattern; for example, the colour or pattern of the clothing worn by the skateboarder, tennis player or cyclist, or the colour of the van.

The user is in the possession of a code which comprises a sequence of particular characteristics (for example 'trousers'+'square logo'+'beard'+'skateboard'). In use, the user selects of designates the particular visual elements in the picture which possess the characteristics according to their code. Thus in the example image, the user would use the touch pad 22 to move the cursor 30 in the image to highlight and then select by clicking the visual elements which possess the above characteristics. Accordingly, the user could designate the cyclist in the third row, centre column as being a visual element which has amongst its characteristics 'trousers'; the user could then designate the second row first column to identify a visual element having the characteristic 'square logo'; designating the first row left hand column would identify a visual element possessing the characteristic 'beard', and finally, designating the second row centre column would identify an image including the characteristic 'skateboard'. The validation unit 16 cc:>compares the characteristics of the various visual elements identified in sequence by the user with the code set of characteristics and if there is a match the validation unit will issue a 'pass' signal otherwise it will issue a 'fail' signal.

Because each visual element possesses several characteristics, it is not possible for someone observing the key strokes or touch pad movements of the user to determine which particular characteristic they are selecting. Indeed, as in the present example, a particular characteristic may be possessed by several different visual elements; thus the skateboarder and cyclist both possess the characteristic 'trousers'.

When the user next requests a validation routine, a different image will be produced by the image generator and displayed on the display 10. This will usually have different visual elements which, generally, will possess different visual characteristics. So, for example, the 'square logo' could appear on e.g. a vehicle, a skateboard, a tin, a bottle etc. However, the code set of characteristics for the user is unchanged and he simply views the image displayed before them and selects again visual elements possessing the characteristics of their code set. In general, also, the nature of the visual element possessing the particular characteristic will vary as between pictures; thus in one image the square logo may be associated with a person, in the next image it could be associated with a container, in the next a vehicle, and so on. Also the location of the relevant visual element will vary between subsequent images, so that the cursor navigation movements will vary between subsequent validation routines even though the code set remains the same.

In a simple implementation, the image generator may generate visual elements and place them in a grid, and the validation unit may store a mapping of the particular characteristics in each cell as set out above. During the validation routine, the validation unit will check the location specified by the user to check whether the characteristics mapped to that location include the relevant member of the code set. Depending on the level of security required, the validation unit may require that the visual elements are designated in the same order as the relevant characteristics appear in the code set; alternatively, the code set may not be sensitive to the order of designation.

It will be noted therefore that each validation or transaction uses a different image, with the characteristics of the image areas in different places each time and it is therefore not possible for a third party to memorise the special properties of a person's code by observing them enter their code, as the spatial arrangement will change from transaction to transaction. Each area of the image has a number of characteristics and so it is not possible to determine from a single observation which characteristic at a particular location was being selected by the user. Therefore the user's code cannot be determined with certainty from a single observation. Of course, as the number of observations increases, the probability that the user's code may be determined increases. It is therefore desirable to minimise the number of repeats requested of the user. By the appropriate composing and generating of the images such that successive images possess multiple co-occurrences of characteristics at any particular position, the probability of determining the user's code by surreptitious observation is reduced.

It should be noted that the validation unit may implement the user designation of a visual element in different ways. Thus on receipt of a cursor click or the equivalent, the validation unit may see this as designation of a notional grid square and therefore designation of any visual element wholly or partly in that square, or it may look for presence of a visual object overlying that location and see this as a direct designation of the visual element. Designation may therefore be grid-referenced or element-referenced.

There are a variety of different ways of generating images. In a first approach, simple shapes of different sizes and colours may be placed in the image in such a way that their boundaries overlap. For example, a 'large red triangle' might contain, wholly or partly, 'a small green star'. The shapes may be positioned in the image in a grid pattern or at random locations.

In a second approach pseudo-realistic objects such as people or vehicles are placed in an image. Each object has a template which sets the general spatial arrangement of the object and defines the variable aspects of the rendering. For example 'a person' template might determine the person's shape with locations for items of clothing, and the rendering rules might specify a choice of trousers or skirt, the shape of a logo on a T-shirt and the colour of an umbrella. Each portion would then be coloured or patterned. The shapes may be positioned in the image in a grid pattern or at random locations.

In a third arrangement a gallery of real images of rich scenes are each labelled by characteristic. In this instance it is important to collect a gallery of images which ensures that all possible codes are present in each image (or in at least most images if the user is given the option of viewing other images).

Images used for authorisation may be generated in a sequence such that the security of the system is increased. For example, in a single session by arranging for maximum co-occurrence of characteristics at each location; while between sessions minimising the co-occurrence of characteristics at each location. This may be accomplished by maintaining a list of existing characteristics at each location and applying a combinatorial scheme such as, for example, simulated annealing.

In order to allow the user to set their own personal code set of characteristics, there are a variety of methods. In the first method, the user may navigate a menu of characteristics and characteristic values, to set their code. The menu in this instance could be multi-level, for example 'clothing'+'trousers'+'green'.

In a second arrangement, during a setting routine, a number of different images may be presented in a series of validation steps and during each step the user may indicate their code by designating in that particular image the visual elements possessing the relevant characteristics. In the final step the validation unit deduces which particular characteristics are consistent with the multiple selections.

In this scheme, the images used for code settings should be generated in a set such that as few co-occurrences of characteristic labels as possible occur at each location. This ensures that the new code may be determined from as few images as possible. The same combinatorial considerations as for generating authorisation images apply except that, in this case, it is required that the set of images possess the property of no co-occurrences in the intersected set of characteristics. The selection of images used for code setting may therefore take longer to generate.

In a third method, a combination of the above two schemes may be used in which any ambiguity resulting from the selection of locations in the presented code setting images is resolved using a menu system.

Embodiments of this invention may be used in a wide range of applications where a user or a user group needs to be validated. Applications therefore include secure door or gate entry systems; secure internet access; secure log on to a computer or a computer network; unlocking of PDAs, mobile phones and other electronic devices; secure access to vending machines; secure access to vehicles and unlocking of immobilisation systems; user identification at point of sale transactions; user identification at ATMs; user identification on web-based transactions.

Depending on the particular application the components making up the system may be co-located at the user interface or they may be at different locations interconnected by a suitable communications link such as the internet, land line, mobile communications network etc. Thus for example in web-based transactions, the user interface 18 and the display 10 will be at the user's work station whereas the image generator and validation unit will be located on the vendor's server.

The user interface may use any of a number of different ways to allow the user to select a visual element or grid on the visual display other than the touch pad.

In the following description of the example embodiment and variations based on FIGS. 2 to 7, the following nomenclature will be used.

Nomenclature

PINoptic Code <PIC)

This is the combination of symbols or pictograms that make up the user's authentication code. the PIC may be order sensitive or insensitive. An example of a PIC code would be 'teapot', '2', 'man', 'house'.

Stored PIC

The PIC as stored by the authentication device. It is generally equivalent to the above but may be stored as a numeric representation, e.g. by storing each symbol as an attribute/position pair denoting the attribute of the symbol and its position in the list, i.e. its order in a list of symbols of that attribute.

Story

The mnemonic used to remember the PIC (e.g. 'tea' for two with the 'vicar' at the 'vicarage').

Pictogram

A symbol or picture to be used as part of the PIC (e.g. a picture of a teapot.

Button

A designatable area of the screen associated with or comprising a subject of the pictograms displayed (e.g. a square representing the button of a keypad). In typical instances the buttons will be arranged as a conventional 10 button 15 keypad.

Button Background

The image displayed behind the subset of pictograms to define more clearly the area associated with the button.

Attribute

A theme associated with a set of pictograms (e.g. digits, household, nature, transport, geometric). In the plural, Attributes is used to describe the number of such themes active at any one time, which is also the number of pictograms on a button.

Attribute Value

A particular pictogram from the attribute set (e.g. teapot, key, bottle, guitar etc.). In the plural, attribute values refer to the set of different pictograms per attribute. This must be less than or equal to the number of buttons to guarantee that every code appears on every screen. Security is maximised if the attribute values are equal to the number of buttons.

Code

The sequence of button indicators entered by the user (in the given example this is typically entered as a digit sequence). In the example below the code was 0213.

Code Length

The number of symbols in the code (four in the example given below) and the most common evaluated.

Attribute Sequence

The sequence of attributes to each part of the PIC (in the example of 'teapot' '2' 'man' 'house' this would be 'household', 'digit', 'nature', 'household').

Entered PIC

The PIC recovered by looking up the attribute values of the entered code on a particular occasion, knowing the attribute sequence. In an example below (FIG. 3) the 'household' value for the first code value '0' is 'teapot'; the 'digit value of 2' is '2', the 'nature' value of '1' is 'man', and the 'household' value for '3' is 'house'.

Figure 2:
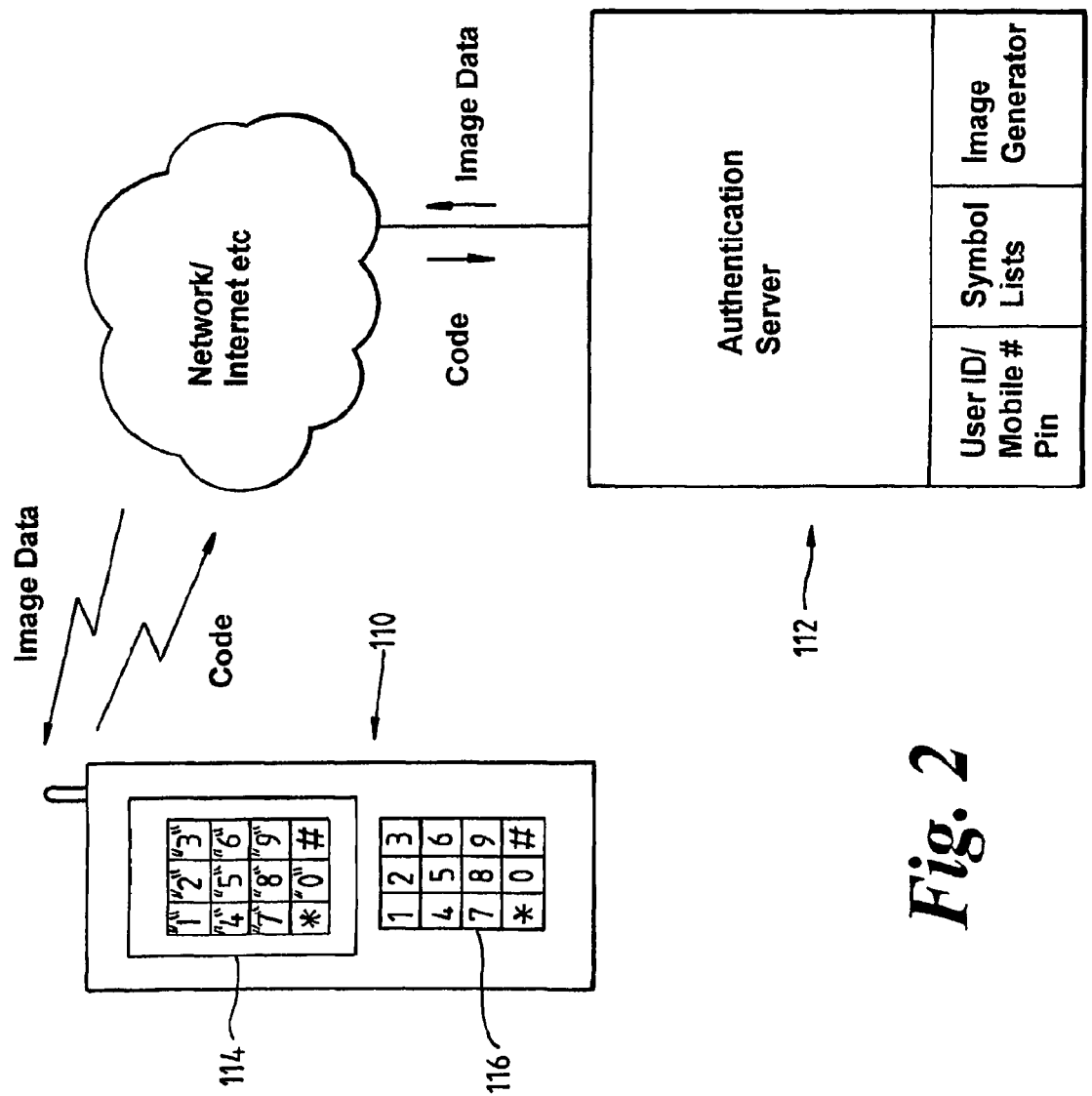
FIG. 2 is a schematic diagram of a first embodiment of user verification system comprising a user terminal in communication with a central server.

As shown in FIG. 2, the system to be described below comprises a user terminal 110, and an authentication server 112. Although these could be colocated, in most applications server 112 will be located away from the terminal 110 and serve many terminals 110 cover a communications network such as a landline, the internet, the mobile telephone system etc. Communications between the server and the terminal will usually be encrypted in both directions by suitable encryption schemes, of known form. The terminal may take many forms such as a computer, tablet, PDA, mobile phone, EPOS device etc. requiring a display 114 and a keypad 116 or other user input device enabling the user to designate a selected area on the display and to communicate their selection to the remote server 112.

We refer now particularly to the screen shot shown in FIG. 3 which here uses a web browser on a computer display screen, with the user keying in digits via the computer keyboard. It will be seen that an image is constructed in which pictograms are set out in grid form corresponding to a 1 0 button keypad. For ease of explanation a grid is shown overlaid on the image but this is not necessary. Each button of the keypad covers three pictograms each having a different attribute—here 'digit', 'household' and 'nature'. With 1 0 buttons there are therefore ten pictograms of attribute 'digit', ten of attribute 'household' and ten of attribute 'nature' distributed across the image. An important feature of this embodiment is that the distribution of the non-digit attributes around the keypad changes with each subsequent presentation of the image and so someone unaware of the user's PIC code will not be able to gain access by watching the user key in his PIC code memorising the keystrokes, because the next time the image is presented the spatial distribution of the keystrokes required will be different.

Each user memorises their PIC code as a sequence of pictograms, which may include one or more digits. Upon requesting authentication, the server constructs and sends to the remote terminal an image to display the notional keypad. At the same time the server creates a table corresponding to the number of buttons (here 1 0) and the number of attributes (here 3) and maps out the distribution of the pictograms as in FIG. 3(b), which correspond to the distribution of the pictograms on the keys in FIG. 3(a). This table will change each time a new keypad image is created. The server also retrieves the user ID and PIC and determines the attribute sequence of the user's PIC code. In this example the PIC code is 'teapot' '2' 'man' 'house' and so the attribute sequence is 'household' 'digit' 'nature' 'household'.

On receiving the keypad image at the remote terminal (110), the user designates by keying in, screen taps, etc. the buttons carrying the pictograms of his PIC (in this instance the PIC is order sensitive), which here are in the form of the digits 0213, referred to as the Code. Upon receiving the Code, the server uses the returned code in conjunction with the recovered Attribute sequence and the map or table as shown in FIG. 3(b) to determine the entered PIC, which here is 'teapot' '2' 'man' 'house', which is then compared with the retrieved PIC, successfully in this case.

Apart from greater immunity to shoulder surfing, this system has further security advantages in that the code returned to the server has no significance unless it is combined with the table mapping the current distribution of the pictograms, and will not be valid for a subsequent transaction. Interception alone therefore of either the keypad image and the returned keystrokes will not crack the user's PIC code. This is of great importance to those requiring security, communications network operators etc., because the authentication routines are kept safely at the server. In the above embodiment the user would normally input the required code by keying in the relevant digits through the numeric keypad, but the button could be designated by many other ways as will be apparent to those skilled in the art.

FIGS. 4(b) and 5(b) show typical examples of other maps of pictograms comprising to the keypad images shown in FIGS. 4(a) and 5(a).

Users may be assigned a code by the operator of the system but many users will appreciate the flexibility and potentially greater security of being able to select and change their PIC code.

This can be done relatively simply in a setting routine by presenting to the user a succession of images of the keypad with the pictograms shuffled in subsequent images and asking the user to designate in successive images the keys which carry his selected pictogram. To assist memorising, the user may like to construct a story which aids recall of the pictograms. By detecting the relevant keys pressed by the user it is a relatively straightforward process for the server to unambiguously determine the user's chosen pictogram sequence making up the PIC code. It can be shown mathematically that only two different appropriately reconfigured keypad images are required provided the number of symbols on each button is less than the total number of buttons. The relaying or shuffling simply requires the pictograms to be shifted around so that no one pictogram is on the same key in the two presentations and likewise no two pictograms are together on the same key between presentations.

Using the examples of 'teapot' '2' 'man' 'house' as before, a setting routine will be described with reference to FIGS. 4 and 5. In the first setting image (FIG. 4 {a}) the user would key in 4235 as these keys contain the relevant pictograms. The next image is assumed to be that of FIG. 5(a), and here the user would key in the digits 1272. Examination of the tables in FIGS. 4(b) and 5(b) shows that keying in digit '4' in the first image and digit '1' in the second image unambiguously identifies the 'teapot'. Keying in digit '2' in the first image and digit '2' in the second image unambiguously identifies the digit '2' and soon.

In a particular embodiment, this system may be used to provide verification of a cardholder at a point of sale. Here a yet further level of security may be provided by the authorising authority. storing not only the user ID and PIC but also the cardholder's mobile phone number. In this scheme a request for verification is initiated in the usual manner by the merchant. The authority's server responds to the request by sending an MMS message to the cardholder's recorded mobile number, the message including a picture message having a suitable image with designatable areas, such as but not limited to the 10 button keypad with pictograms as set out for example in any one of FIGS. 3 to 5. As in the previous example, the server also retrieves the user's PIC code, determines the attribute sequence, and assembles the pictogram map as in FIGS. 3(b) to 5(b). The user on receipt of the message, opens it to view the picture and the keys in the appropriate keys to identify the location of the selected pictograms. The code is then returned by SMS to the server, which then performs the validation routine as before and notifies the merchant whether this verification has been successful.

As shown schematically in FIG. 6, each symbol is allocated to a different number each time it is presented. The user finds the symbol on the current image of the keypad and presents the appropriate number. The keypad entry is verified against the number symbol list which translates each symbol into an attribute (or category)/position pair. The system reads the stored PIC and compares it to the derived PIC. In this arrangement the symbol list is stored separately from the PIC code.

Referring now to FIG. 7, it is a relatively simple matter for the authenticating authority to regenerate the PIC database if the need arises e.g. for greater security. The sequence of the symbols in each attribute is adjusted and the database reconstructed with new attribute (or category)/position pairs.

In order to simplify computational requirements, the images of the keyboard may be prepared and stored as e.g. a library of 1,000 sub-images, with the server selecting 10 of these to make up an array.

At a very simple level, security could be provided by assigning just one attribute (i.e. digit) per button, and operating an authentication system in which the remote server stores user JD's and PIN codes (e.g. 4 digit codes) together with the user's mobile phone number as previously outlined. In an authentication routine, on receiving a request for authentication of a user, the server would communicate with the user by calling or SMS messaging on their mobile phone. The server would request the user to key in their PIN code which would be transmitted back to the server by phone or SMS, with the server then comparing the returned PIN code with that stored.

The invention claimed is:

1. A method of validating a user of a device, in which data representative of a validation code for a user is stored in a storage device, said data comprising a combination of characteristics selected from a set of characteristics, the method comprising:
   presenting, via a programmed processor of the device, a displayed image including a plurality of designatable cells, each designatable cell containing a symbol having a plurality of characteristics from said set of characteristics, each of said characteristics of said combination of characteristics being contained within at least one designatable cell;
   varying, via the programmed processor of the device, the image between an initial presentation and a subsequent presentation such that the plurality of characteristics contained in a designatable cell in the subsequent presentation is different from the plurality of characteristics contained in the designatable cell in the initial presentation; and
   validating, via the programmed processor of the device, a user in a validation routine by detecting designation by the user of the device of a combination of said designatable cells in a presented image, each such designation identifying a plurality of characteristics, and determining whether the identified plurality of characteristics comprises said combination of characteristics making up the validation code for said user.

2. A method according to claim 1, wherein individual ones of the plurality of characteristics contained in a given designatable cell in the initial presentation are distributed between a plurality of designatable cells in the subsequent presentation.

3. A method according to claim 1, in which each said presentation comprises a plurality of symbols, each contained within a different designatable cell, and the plurality of symbols in the subsequent presentation is different from the plurality of symbols in the initial presentation.

4. A method according to claim 1, wherein said designatable cells make up a grid which maps to a key pad of the device, and the user designates a designatable cell using a corresponding key of the key pad.

5. A user validation system for validating the user of a device, the user validation system comprising:
   a storage device storing data representative of a validation code for a user comprising a combination of characteristics selected from a set of characteristics;
   a display presenting a displayed image including a plurality of designatable cells, each designatable cell containing a symbol having a plurality of characteristics from said set of characteristics, each of said characteristics of said combination of characteristics being contained within at least one designatable cell;
   a processor programmed to vary the displayed image between an initial presentation and a subsequent presentation such that the plurality of characteristics contained in a designatable cell in the subsequent presentation are different from the plurality of characteristics contained in the designatable cell in the initial presentation; and
   the processor programmed to validate the user of the device in a validation routine by detecting designation by the user of the device of a combination of said designatable cells in a presented image, each such designation identifying a plurality of characteristics, and determining whether the identified plurality of characteristics comprises the combination of characteristics making up the validation code for said user.

6. A system according to claim 5, wherein individual ones of the plurality of characteristics contained in a given designatable cell in the initial presentation are distributed between a plurality of designatable cells in the subsequent presentation.

7. A system according to claim 5, in which each said presentation comprises a plurality of symbols, each contained within a different designatable cell, and the plurality of symbols in the subsequent presentation is different from the plurality of symbols in the initial presentation.

8. A device comprising a system according to claim 5, wherein the device comprises a keypad and said designatable cells make up a grid which maps to said keypad and said processor programmed to validate the user of the device detects designation of a combination of designatable cells by detecting designation by the user of a combination of keys of the keypad.

9. A server for use with a remote device, the server being adapted to validate a user of the remote device and the remote device having an interface including a display and a user interface, the server comprising:
   a storage device adapted to store data representative of a validation code for a user, said data comprising a combination of characteristics selected from a set of characteristics,
   said server being configured to generate a plurality of images for display by the display of the device, each said image containing a plurality of designatable cells, each designatable cell containing a symbol having a plurality of characteristics from said set of characteristics, each of said characteristics of said combination of characteristics being contained within at least one designatable cell, and said images being such that the plurality of characteristics contained in a designatable cell in a first said generated image are different from the plurality of characteristics contained in that designatable cell in a second said generated image;

said server being further configured to transmit to said remote device, image data representing a said generated image, and being operable to receive from said remote device user data representing a plurality of said designatable cells in said transmitted image as designated by a user of the device via the user interface, each such designation identifying a plurality of characteristics, the server further comprising a validator for comparing the identified plurality of characteristics with said combination of characteristics that make up the validation code for said user, and outputting a validation signal if there is a correspondence.

10. A server according to claim 9, wherein individual ones of the plurality of characteristics contained in a given designatable cell in the initial presentation are distributed between a plurality of designatable cells in the subsequent presentation.

11. A server according to claim 9, wherein each said presentation comprises a plurality of symbols, each contained within a different designatable cell and the plurality of symbols in the subsequent presentation is different from the plurality of symbols in the initial presentation.

12. A non-transitory computer readable storage medium having a computer program stored thereon, which, when executed by a processor of a device, causes the device to perform the steps of:

generating a plurality of images in turn for display to a user of the device via the display of the device, each said image including a plurality of designatable cells, each designatable cell containing a symbol having a plurality of characteristics from a set of characteristics, said set of characteristics comprising characteristics that make up a validation code for a user, each of said characteristics making up the validation code being contained within at least one designatable cell, said images being generated such that the plurality of characteristics contained in a designatable cell in a first said generated image are different from the plurality of characteristics contained in that designatable cell in a second said generated image;

causing the display of the device to display a said generated image; receiving user data representing a plurality of said designatable cells in the said displayed image as designated by the user of the device, each such designation identifying a plurality of characteristics;

comparing the identified plurality of characteristics with said characteristics that make up the validation code for said user, and outputting a validation signal if there is a correspondence.

13. A non-transitory computer readable storage medium according to claim 12, wherein individual ones of the plurality of characteristics contained in a given designatable cell in the initial presentation are distributed between a plurality of designatable cells in the subsequent presentation.

14. A non-transitory computer readable storage medium according to claim 12, wherein each said presentation comprises a plurality of symbols, each contained within a different designatable cell and the plurality of symbols in the subsequent presentation is different from the plurality of symbols presented in the initial presentation.

15. A non-transitory computer readable storage medium according to claim 12, wherein said designatable cells make up a grid which maps to a key pad of the device.

* * * * *